(12) United States Patent
Merkle et al.

(10) Patent No.: US 7,288,279 B2
(45) Date of Patent: Oct. 30, 2007

(54) FORMULATED FRIED EGG PRODUCT

(75) Inventors: Jonathan Merkle, Green Isle, MN (US); Hershell Ball, Waconia, MN (US); Jason Mathews, Gaylord, MN (US)

(73) Assignee: Michael Foods of Delaware, Inc., Minnetonka, MN (US)

( * ) Notice: Subject to any disclaimer, the term of this patent is extended or adjusted under 35 U.S.C. 154(b) by 0 days.

(21) Appl. No.: 10/165,043

(22) Filed: Jun. 6, 2002

(65) Prior Publication Data
US 2003/0134030 A1    Jul. 17, 2003

Related U.S. Application Data

(63) Continuation-in-part of application No. 10/161,046, filed on May 31, 2002, now abandoned.

(60) Provisional application No. 60/342,405, filed on Dec. 21, 2001.

(51) Int. Cl.
*A23L 1/32* (2006.01)
(52) U.S. Cl. .......................... 426/614; 426/89
(58) Field of Classification Search ................ 426/614, 426/89
See application file for complete search history.

(56) References Cited

U.S. PATENT DOCUMENTS

| | | | |
|---|---|---|---|
| 1,756,189 A | 4/1930 | Fousek | |
| 1,900,444 A | 3/1933 | Heuser | |
| 1,929,919 A | 10/1933 | Ekstedt | 107/8 |
| 1,989,359 A | 1/1935 | Heuser | 99/11 |
| 2,000,384 A | 5/1935 | Frantz | 107/54 |
| RE19,898 E | 3/1936 | Fousek | 99/161 |
| 2,052,028 A * | 8/1936 | Harris et al. | 426/614 |
| 2,093,786 A | 9/1937 | Swarthout | 99/113 |
| 2,159,246 A | 5/1939 | Beyer | 107/54 |
| 2,176,078 A * | 10/1939 | Katzman | 426/568 |

(Continued)

FOREIGN PATENT DOCUMENTS

EP    157619 A2    4/1985

(Continued)

OTHER PUBLICATIONS

U.S. Appl. No. 10/161,046, filed May 31, 2002, Merkle et al.

(Continued)

*Primary Examiner*—Anthony Weier
(74) *Attorney, Agent, or Firm*—Fredrikson & Byron, PA

(57) ABSTRACT

The present invention relates to the formulation and process for preparation of a fried egg product which may be frozen for future heating within a microwave or other oven for consumption by an individual. Various ingredients are added and mixed to each of the liquid egg white and liquid yolk portions. The liquid egg white portion is preheated and then deposited within a mold for slow cooking under controlled temperature and humidity conditions. The liquid yolk portion is preheated and then is added to the mold for placement on the egg white portion. Following a short period of cooking the mold containing the formulated fried eggs is transported to a freezer unit for freezing, packaging, and storage. At a future time the frozen formulated fried egg product may be retrieved for thawing and cooking for consumption by an individual.

11 Claims, 2 Drawing Sheets

U.S. PATENT DOCUMENTS

| | | | |
|---|---|---|---|
| 2,234,526 A | 3/1941 | Guldbech | 107/54 |
| 2,395,587 A | 2/1946 | Scott et al. | 99/113 |
| 2,463,112 A | 3/1949 | Kipnis | 107/54 |
| 2,565,311 A | 4/1951 | Koonz et al. | 99/161 |
| 2,593,577 A | 4/1952 | Lewis | 99/4 |
| 2,848,334 A | 8/1958 | Jones | 99/113 |
| 2,902,396 A * | 9/1959 | Reynolds | 428/337 |
| 2,920,966 A | 1/1960 | Heinemann | 99/113 |
| 3,027,852 A | 4/1962 | Key | 107/8 |
| 3,038,418 A | 6/1962 | Gugler | 107/8 |
| 3,043,700 A | 7/1962 | Szczesniak | 99/92 |
| 3,113,872 A | 12/1963 | Jones et al. | 99/161 |
| 3,212,906 A | 10/1965 | Jones | 99/161 |
| 3,260,606 A | 7/1966 | Azuma | 99/113 |
| 3,293,044 A | 12/1966 | Torr | 99/113 |
| 3,404,008 A | 10/1968 | Ballas et al. | 99/161 |
| 3,409,446 A | 11/1968 | Olphen | 99/210 |
| 3,459,560 A | 8/1969 | Shea | 99/92 |
| 3,522,777 A | 8/1970 | Schafer | 107/8 |
| 3,547,658 A * | 12/1970 | Melnick | 426/120 |
| 3,594,183 A * | 7/1971 | Melnick | 426/573 |
| 3,640,731 A | 2/1972 | Kaplow et al. | 99/113 |
| 3,640,732 A | 2/1972 | Johnson | 99/114 |
| 3,652,397 A | 3/1972 | Pardun | 195/30 |
| 3,655,405 A | 4/1972 | Karas et al. | 99/94 |
| 3,662,672 A | 5/1972 | Hoer | 99/17 |
| 3,697,290 A | 10/1972 | Lynn | 99/86 |
| 3,864,500 A | 2/1975 | Lynn | 426/195 |
| 3,889,012 A | 6/1975 | Riviere et al. | 426/500 |
| 3,920,857 A | 11/1975 | Barker et al. | 426/307 |
| 3,941,892 A * | 3/1976 | Glasser et al. | 426/104 |
| 3,958,034 A | 5/1976 | Nath et al. | 426/614 |
| 3,982,040 A | 9/1976 | Oborn | 426/614 |
| 3,987,212 A | 10/1976 | Seeley et al. | 426/614 |
| 4,000,323 A | 12/1976 | Youngquist | 426/93 |
| 4,025,260 A | 5/1977 | Neel | 425/131.1 |
| 4,034,124 A | 7/1977 | van Dam | 426/602 |
| 4,046,922 A * | 9/1977 | Burkwall, Jr. | 426/104 |
| 4,068,013 A | 1/1978 | Brule | 426/565 |
| 4,120,986 A * | 10/1978 | Lynn | 426/549 |
| 4,157,404 A | 6/1979 | Yano et al. | 426/429 |
| 4,200,663 A | 4/1980 | Seeley et al. | 426/614 |
| 4,219,585 A | 8/1980 | Herring | 426/614 |
| 4,234,619 A | 11/1980 | Yano et al. | 426/614 |
| D272,009 S | 1/1984 | Zonnenberg | D1/13 |
| 4,425,367 A * | 1/1984 | Berkowitz et al. | 426/89 |
| 4,428,971 A | 1/1984 | Havette et al. | 426/565 |
| 4,466,923 A | 8/1984 | Friedrich | 260/412.4 |
| 4,478,866 A | 10/1984 | Ohta et al. | 426/549 |
| 4,493,854 A | 1/1985 | Friedrich et al. | 426/629 |
| 4,495,207 A | 1/1985 | Christianson et al. | 426/312 |
| 4,524,082 A * | 6/1985 | Liot | 426/312 |
| 4,524,083 A | 6/1985 | Liot | 426/330.1 |
| 4,574,690 A | 3/1986 | Chiao et al. | 99/353 |
| 4,612,197 A | 9/1986 | Postner | 426/47 |
| 4,618,499 A | 10/1986 | Wainwright | 426/283 |
| 4,670,285 A | 6/1987 | Clandinin et al. | 426/602 |
| 4,703,060 A | 10/1987 | Traitler et al. | 514/549 |
| 4,714,571 A | 12/1987 | Tremblay et al. | 260/403 |
| D295,225 S | 4/1988 | Ito | D1/125 |
| 4,746,521 A | 5/1988 | Niwano et al. | 426/241 |
| 4,776,173 A | 10/1988 | Kamarei et al. | 62/63 |
| 4,794,009 A | 12/1988 | Dreisin | 426/283 |
| 4,808,425 A | 2/1989 | Swartzel et al. | 426/399 |
| 4,814,111 A | 3/1989 | Kearns et al. | 260/403 |
| 4,844,926 A | 7/1989 | Hatanaka | 426/282 |
| 4,847,015 A | 7/1989 | Shigematsu et al. | 260/403 |
| 4,857,329 A | 8/1989 | Sako et al. | 424/195.1 |
| 4,879,125 A | 11/1989 | Pak | 426/120 |
| 4,880,573 A | 11/1989 | Courregelongue et al. | 260/420 |
| 4,880,639 A | 11/1989 | Lauermann | 426/2 |
| 4,925,637 A | 5/1990 | Julien et al. | 426/2 |
| 4,957,760 A | 9/1990 | Swartzel et al. | 426/399 |
| 4,957,768 A | 9/1990 | Dutilh | 426/604 |
| 4,994,291 A | 2/1991 | Swartzel et al. | 426/399 |
| 4,997,668 A | 3/1991 | Johnson et al. | 426/580 |
| 5,024,846 A | 6/1991 | McLachlan et al. | 426/312 |
| 5,026,565 A | 6/1991 | McLachlan et al. | 426/241 |
| 5,028,448 A * | 7/1991 | Ros | 426/614 |
| 5,037,661 A * | 8/1991 | Merchant et al. | 426/47 |
| 5,061,505 A | 10/1991 | Cully et al. | 426/601 |
| 5,063,070 A | 11/1991 | Klemann et al. | 426/271 |
| 5,064,668 A | 11/1991 | Klemann et al. | 426/271 |
| 5,073,267 A | 12/1991 | Adda et al. | 210/634 |
| 5,073,399 A | 12/1991 | Vassiliou | 426/614 |
| 5,082,674 A | 1/1992 | Carrell et al. | 426/52 |
| 5,084,215 A | 1/1992 | Kearns et al. | 260/403 |
| 5,091,117 A | 2/1992 | Athnasios et al. | 260/428 |
| 5,092,964 A | 3/1992 | Conte, Jr. et al. | 203/29 |
| 5,097,017 A | 3/1992 | Konwinski | 530/378 |
| 5,116,628 A | 5/1992 | Ogasahara et al. | 426/330.1 |
| 5,120,556 A | 6/1992 | Fujimoto et al. | 426/330.3 |
| 5,120,559 A | 6/1992 | Rizvi et al. | 426/446 |
| 5,130,155 A | 7/1992 | Yamate | 426/330.1 |
| 5,132,288 A | 7/1992 | Johnson et al. | 514/11 |
| 5,147,672 A | 9/1992 | McLachlan et al. | 426/241 |
| 5,151,188 A | 9/1992 | Hoppet et al. | 210/634 |
| 5,213,968 A | 5/1993 | Castle et al. | 435/68.1 |
| 5,238,694 A * | 8/1993 | Ogasahara et al. | 426/330.1 |
| 5,246,717 A | 9/1993 | Garwin | 426/2 |
| 5,262,190 A | 11/1993 | Cunningham et al. | 426/549 |
| 5,268,442 A | 12/1993 | Bradshaw et al. | 528/25 |
| 5,283,072 A | 2/1994 | Cox et al. | 426/312 |
| 5,287,632 A | 2/1994 | Heit et al. | 34/9 |
| 5,288,619 A | 2/1994 | Brown et al. | 435/134 |
| 5,290,583 A | 3/1994 | Reznik et al. | 426/614 |
| 5,302,405 A | 4/1994 | Hsieh et al. | 426/271 |
| 5,304,546 A | 4/1994 | Comini et al. | 552/545 |
| 5,378,487 A | 1/1995 | Merchant et al. | 426/580 |
| 5,399,369 A | 3/1995 | Singer | 426/417 |
| 5,403,898 A | 4/1995 | Bradshaw et al. | 525/474 |
| 5,470,377 A | 11/1995 | Whitlock | 95/90 |
| 5,478,585 A | 12/1995 | Isono et al. | 426/417 |
| 5,487,911 A | 1/1996 | Ueda et al. | 426/614 |
| 5,514,401 A | 5/1996 | Zeidler et al. | 426/429 |
| 5,552,173 A | 9/1996 | Singh et al. | 426/417 |
| 5,584,989 A | 12/1996 | Jameson | 210/137 |
| 5,589,211 A | 12/1996 | Cox et al. | 426/298 |
| 5,599,381 A | 2/1997 | Whitlock | 95/90 |
| 5,601,707 A | 2/1997 | Clay et al. | 210/198.2 |
| 5,616,352 A | 4/1997 | Heidlas et al. | 426/312 |
| 5,620,735 A | 4/1997 | Manderfeld et al. | 426/614 |
| 5,647,976 A | 7/1997 | Rothe et al. | 210/137 |
| 5,653,885 A | 8/1997 | Jameson et al. | 210/634 |
| 5,656,319 A | 8/1997 | Barclay | 426/574 |
| 5,665,416 A | 9/1997 | Manderfeld et al. | 426/614 |
| 5,670,614 A | 9/1997 | Roby et al. | 528/480 |
| 5,676,737 A | 10/1997 | Whitlock | 95/90 |
| 5,690,828 A | 11/1997 | Clay et al. | 210/634 |
| 5,718,937 A | 2/1998 | Heidlas et al. | 426/533 |
| D391,737 S | 3/1998 | Wright | D1/125 |
| 5,738,498 A | 4/1998 | Arlington et al. | 417/53 |
| 5,750,679 A | 5/1998 | Haas et al. | 536/127 |
| 5,755,559 A | 5/1998 | Allington et al. | 417/53 |
| 5,759,549 A | 6/1998 | Hhiltunen et al. | 424/195.1 |
| 5,780,095 A | 7/1998 | Jackeschky | 426/614 |
| 5,783,243 A | 7/1998 | Benado | 426/425 |
| 5,843,311 A | 12/1998 | Richter et al. | 210/634 |
| 5,880,300 A | 3/1999 | Kodali | 554/190 |
| 5,882,565 A | 3/1999 | Wood et al. | 264/209.5 |
| 5,932,276 A * | 8/1999 | Bhatia et al. | 426/614 |

| | | | |
|---|---|---|---|
| | 6,235,330 B1 * | 5/2001 | Scherpf et al. ............. 426/302 |

FOREIGN PATENT DOCUMENTS

| | | |
|---|---|---|
| EP | 0371856 | 11/1988 |
| EP | 387708 A1 | 3/1990 |
| EP | 0426425 * | 10/1990 |
| EP | 0426425 A1 | 10/1990 |
| EP | 426425 B1 | 10/1990 |
| EP | 0493045 B1 | 12/1991 |
| EP | 503293 A1 | 2/1992 |
| EP | 503293 B1 | 2/1992 |
| EP | 05311041 | 9/1992 |
| EP | 0545025 B1 | 10/1992 |
| EP | 0611281 B1 | 5/1993 |
| GB | 1525929 | 11/1974 |
| JP | 59-37060 | 1/1977 |
| JP | 59-135847 | 1/1983 |
| JP | 60-105471 | 11/1983 |
| JP | 60-163570 | 7/1985 |
| JP | 61-106329 | 5/1986 |
| JP | 62-262998 | 11/1987 |
| JP | 2-283263 | 4/1989 |
| WO | WO92/22220 | 6/1992 |
| WO | WO96/39873 | 5/1996 |

OTHER PUBLICATIONS

U.S. Appl. No. 60/342,405, filed Dec. 21, 2001, Merkle et al.

Loit Company Brochure (date unknown).

Cutler Egg Products Brochure (date unknown).

Sugihara et al, "Heat Pasteurization fo Liquid Whole Egg", *Food Technology*, vol. 20 No. 8 pp. 100-107 Aug. 1966.

Ella M. Barnes, The Intestinal Microflora of Poultry and Game Birds During Life and After Storage, *Journal of Applied bacteriology*, vol. 46, pp. 407-419, 1979.

Robert Austrian, "Microbiology Including Immunology and Molecular Genetics Third Edition, Chapter 25, Chemotherapy of Baterial Diseases", pp. 574-584, date unknown.

G.W. Froning et al, "Extraction of Cholesterol and Other Lipids from Dried Egg Yolk Using Supercritical Carbon Dioxide", *Journal of Food Science*, vol. 55 No. 1, pp. 95-98, 1990.

Stadelman et al, Egg Science and Technology Second Edition, *AVI Publishing company, Inc*, pp. 261-263, 1977.

Kenneth R. Swartzel,"Equivalent-Point Method for Thermal Evaluation of Continuous-Flow Systems", *Agricultrual and Food Chemistry*, vol. 34, pp. 396-401, May/Jun. 1986.

Dr. F. DeMeester, "New Developments in Yolk-Containing Egg Powders", pp. 236-240, date unknown.

L. Kwan et al., "Fractionation of Water-Soluble and-Insoluble Components from Egg Yolk with Minimum Use of Organic Solvents", *Journal of Food Science*, 1991.vol. 56, No. 6, pp. 1537-1541, 1991.

Hatta et al, "Separation of Phospholipids from Egg Yolk and Recovery of Water-Soluble Protiens", *Journal of Food Science*, vol. 53, No. 2, pp. 425-431, 1988.

Fichtali et al, "Purification of Anitbodies from Industrially Separated Egg Yolk", *Journal of Food Science*, vol. 58, No. 6, pp. 1282-1290, 1993.

Data for Papetti's Calcium Patent Information, "Cholesterol-Free, Fat-Free, Egg Centeral Location Test", Dec. 1999.

E.O. Essary et al., "New uses of Heated Aseptically Fluid Egg Products", *Department of Food Science and Tehcnolgy and Chenical Engineering*,pp. 1-20, date unknown.

Clem Honer, Egg Processor Lays Claim To Latest Tehcnolgy, *Prepared Foods*, pp. 122-123, Jul. 1989.

Basant B. Shah et al., Separation off Egg Yolk Proteins and Lipids with Carboxymethyl Cellulose, *Journal of Food Processinbg and Preservation*, vol. 16, pp. 275-288, 1992.

Makoto Shimizu et al, Egg Yolk Antibody (IgY) Stability inAqueous Solution with high Sugar.

Concentrations, Joural of Food Science, vol. 59, No. 4, 1994, pp. 763-766, 1994.

Hideaki Yokoyama et al, A Two-Step Procedure for Purification of Hen Egg Yolk Immunoglobulin G: Utilization of Hydrozypropylmethylcellulose Phthalate and Synthetic Affinity Ligand Gel (Avid AL), *Immunology Research Institute in Gifu*, vol. 72, pp. 275-281, 1993.

Tokarska et al, "Extraction of Egg Yolk Oil of Reduced Cholesterol Content", *Canadian Institute Food Science and Technology*, vol. 18, No. 3, 1985.

E.M. Akita et al, "Immunogloblulins from Egg Yolk: Isolation and Purification", *Journal of Food Science*, vol. 57, No. 3, 1992, pp. 629-634.

A. Paraskevopoulou et al, "Texture Profile Analysis of heat-Formed Gels and Cakes Prepared with Low Cholesterol Egg Yolk Concentrates", *Journal of Food Science*, vol. 62, No. 1, pp. 208-211,1997.

Abalo C. Awade, "On hen egg fractionation: applications of liquid chromatography to the isolation and purification of hen egg white and egg yolk proteins", Lebensm Unters Forsch vol. 202, pp. 1-14, 1996.

Ladislav Kolarovic et al, "A Comparison of Extraction Methods for the Isolation of Phospholipids from Biological Sources", *Analytical Biochemistry*, vol. 156, pp. 244-250. 1986.

A. Paraskevopoulou et al, "Cholesterol and Other Lipid Extraction from Egg Yolk Using Orgainc Solvents: Effects onf Functional Properties of Yolk", *Journal of Food Science*, vol. 59, No. 4, pp. 766-768,1994.

* cited by examiner

FORMULATED FRIED EGG PRODUCT

The present application is a continuation-in-part patent application of U.S. Utility patent application Ser. No. 10/161,046 filed May 31, 2002, now abandoned which claims priority to U.S. Provisional Patent Application No. 60/342,405 filed Dec. 21, 2001, the entire contents of which incorporated by reference herein.

BACKGROUND OF THE INVENTION

The present invention is directed to a formulation for a fried egg product and process to prepare a premium formulated fried egg for consumption. It is anticipated that the formulated fried egg product will be refrigerated and/or frozen for future heating within a microwave, convection oven or griddle for consumption as a stand alone food item or as a portion of a composite food article. The formulated fried egg has a texture and other sensory perceptions similar to a naturally fried egg.

In the past, formulated fried eggs have been formed by the filling of a mold with a liquid egg mixture and then cooking the liquid egg mixture within the mold. Many problems have arisen through the implementation of this processing methodology. Formulated fried eggs produced according to the above-identified methods exhibit undesirable sensory perceptions related to the appearance, taste and texture as compared to a freshly fried egg.

One method to address these issues has been with the use of a frozen, formulated, frozen egg yolk piece that is placed in a mold that is then flooded with an egg white mixture (US005665416A; US00D376251; US005620735A; US00D373234). This invention overcomes the limitations of previous attempts to achieve a formulated fried egg product that has similar appearance, taste, and texture of a fried shell egg through the use of process and ingredient technology.

Manderfeld, U.S. Pat. No. 5,665,416, teaches the use of a simulated egg patty which is formed through the use of a predetermined amount of yolk which is frozen and which is gel-like and self supporting for combination with a frozen shaped predetemined amount of egg white. The product is then cooked to obtain a simulated patty.

Manderfeld, U.S. Pat. No. 5,620,735, teaches the use of simulated egg yolks and whites which are shaped and frozen to provide a gel-like yolk structure which is self supporting and essentially retains its shape upon thawing. The shaped egg yolk portion and egg white portion after combining are cooked to form a simulated patty.

Cox, U.S. Pat. No. 5,283,072, teaches the use of a modified and simulated liquid poultry egg where the yolk composition may be used in baking or combined with egg white, a modified egg white, or a simulated egg white to produce a simulated blended whole poultry egg composition. Further, this patent teaches the use of treating the egg composition with an oxidizing gas in an amount effective for reducing bacterial count and heating the composition to a temperature effective for further reducing the bacterial count without substantially denaturing the composition, degassing the composition, and cooling the composition at a rate sufficient to stabilize the blend.

A need exists to develop a formulated fried egg which is more appealing in appearance and taste and which is susceptible to freezing and reheating within a conventional oven or microwave heating prior to consumption.

In the past the cooking and freezing or extended refrigeration of a formulated fried egg has lead to a loss of a cohesive texture and the degradation of other sensory perceptions such as mouth feel, taste, elasticity, and/or the food product not being tender or appealing to an individual.

Another common problem encountered is syneresis, or the loss of water when frozen and reheated, or when stored for an extended period of time under refrigeration.

In the past, formulation and processing conditions during the cooking procedure for the formulated fried eggs have caused loss of elasticity, and have resulted is a non-smooth, non-cohesive texture. In addition, this has resulted in a product that is not tender and fails to easily fracture and break like a fried shell egg. The cooking of the formulated fried egg at an elevated temperature, to minimize the duration of the cooking time, frequently results in the degradation of the texture of the formulated fried egg. Also, during rapid cooking the formulated fried eggs easily dehydrate and form a crust which is unappealing.

The rate of cooking of the formulated fried eggs and the temperature of the oven, or other cooking vessel, also frequently cause the formation of an excessive volume of air bubbles, which in turn, interrupt the structure of the formulated fried egg destroying the smooth, cohesive texture.

It is also desirable to provide a formulated fried egg which is natural in appearance. In the past, formulated fried eggs have included a symmetrically centered egg yolk that does not appear to be natural. Natural fried eggs, with a broken yolk, exhibit a random yolk appearance.

BRIEF DESCRIPTION OF THE INVENTION

The present invention relates to the formulation and process for preparation of a fried egg product which may be refrigerated and/or frozen for future heating within a microwave or other oven for consumption.

The egg source of the invention is preferably natural whole egg, or egg yolk and egg whites separated from whole egg. Further, these natural egg components may also include dried egg yolk, frozen egg yolk, dried egg white, frozen egg white, and dried whole egg, or combinations of these with other added ingredients. The egg source may contain minor amounts of additives including sodium lauryl sulfate (SLS or SDS) or triethyl citrate (TEC) as whipping aids for dried and frozen egg whites respectively. The preferred egg source is liquid egg yolk and egg white produce from the breaking and separation of whole shell eggs. Alternatively, whole egg may be utilized as a substitute for the egg yolk portion. These egg sources may be raw or pasteurized.

Various ingredients are added and mixed to each of the liquid egg white and liquid yolk portions. The liquid egg white portions, the liquid yolk portions and additional ingredients are individually mixed under controlled conditions to avoid over mixing and/or over gassing of the liquid egg portions which would adversely affect the quality of the end product. The liquid egg white and egg yolk portions are preheated and then deposited in a mold for cooking. This mold may be open or completely sealed. Following a short period of cooking, the cooked product is cooled and if desired, then frozen. At a future time the fried egg product may be retrieved for reheating for consumption. The formulated fried egg product made according to the parameters described herein yields a enhanced fried egg product having sensory perceptions and the appearance of a naturally fried egg.

A principle advantage of the present invention is to create a formulated fried egg product having improved texture.

Another principle advantage of the present invention is to create a formulated fried egg product that has a natural look of fried eggs.

Still another principle advantage of the present invention is to create a formulated fried egg product which may be formed through the use of commercially available equipment.

Still another principle advantage of the present invention is to create a formulated fried egg product which has a smooth, elastic texture resembling the egg white of a naturally fried egg.

Still another principle advantage of the present invention is to create a formulated fried egg product which has a more appetizing appearance.

Still another principle advantage of the present invention is to provide an improved formulated fried egg product formed from relatively simple and inexpensive ingredients and processing equipment which fulfills the intended purpose of enhancing the appeal and appearance of a formulated fried egg product without fear of damage to the food article and/or food processing equipment and/or illness to individuals.

Still another principle advantage of the present invention is the addition of starches, gums, and oil to improve the functional characteristics of the food article, specifically the texture and mouth-feel upon reheating.

Still another principle advantage of the present invention the use of FDA approved ingredients for formulation of a fried egg product.

Still another advantage of the present invention is the provision of the efficient control of mixing and cooking parameters to formulate a desired quality of formulated fried egg product.

Still another advantage of the principle invention is the provision of a formulated fried egg product which may be held as frozen, refrigerated, and/or hot for extended periods of time without loss of product integrity.

Still another principle advantage of the present invention is the provision of a formulated fried egg product that has been processed over specific durations of time.

Still another advantage of the principle invention is the provision of a superior formulated fried egg product that includes characteristics not found in other food articles within the same product classification.

Still another advantage of the principle invention is the provision of a formulated fried egg product having enhanced product consistency which is not found in other food articles within the same product classification.

Still another advantage of the principle invention is the provision of a formulated fried egg product that remains intact following refrigeration and/or freezing and subsequent reheating for consumption.

Still another principle advantage of the present invention is the provision of a formulated fried egg product having improved texture and flavor as related to other food articles within the same product classification.

Still another principle advantage of the present invention is the provision of a formulated fried egg product which minimizes syneresis of the egg product during processing, cooling, refrigeration, and/or freezing and subsequent storage for further reheating prior to consumption by an individual.

BRIEF DESCRIPTION OF THE SEVERAL VIEWS OF THE DRAWING(S)

DETAILED DESCRIPTION OF THE INVENTION

Figure 1:
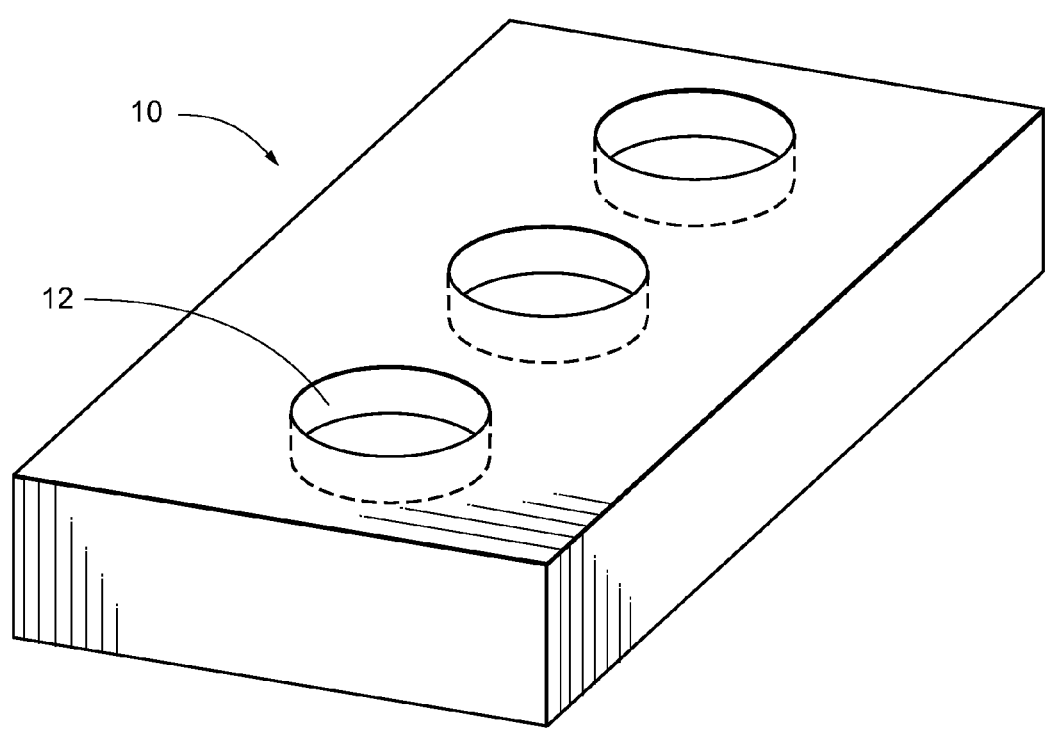
FIG. 1 shows a mold utilized to cook the formulated fried egg.
Figure 2:
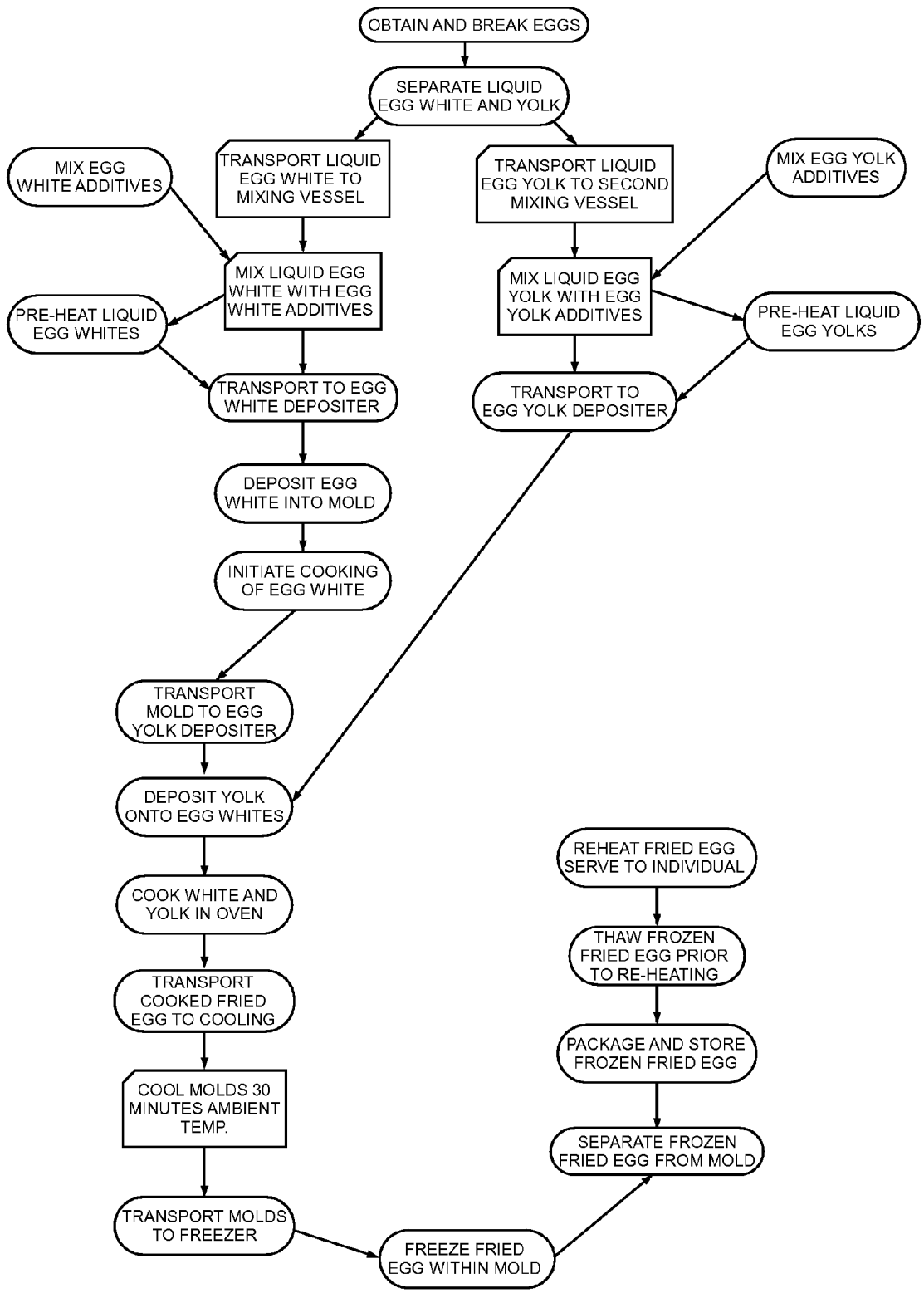
FIG. 2 shows is a block diagram showing the processing steps during the formation of the fried egg product.

In general, the disclosed invention relates to a formulated fried egg product, and a process (FIG. 2) to prepare the formulated fried egg product. The formulated fried egg product is generally formed of an egg white portion and an egg yolk portion.

The formulated fried egg product following cooking is preferably stored frozen and heated prior to consumption. The product may also be cooked and held refrigerated until reheated for consumption. This product may be used or incorporated into a composite food product.

The disclosed formulation for the fried egg product, and process to prepare the formulated fried egg product, originates with liquid egg whites and liquid egg yolks which, when cooked, and combined with other ingredients, may be frozen and/or refrigerated for reheating within microwave ovens, convection ovens, griddles or any other type of heating device without limitation, for consumption as an individual or combination component for a consumable food product. The formulated fried egg article may include a wide range of egg product and ingredient formulations, which when mixed, frozen and/or refrigerated, followed by reheating result in a visually and sensory appealing formulated fried egg.

The formulations and food processing techniques described herein minimize undesirable effects of the fried egg being rubbery, or exhibiting syneresis or loss of water when frozen, reheated, or when stored for an extended duration of time. The formulations and food process techniques described herein further minimize waste of the consumable formulated fried egg.

The present methodology for formulation of the fried egg product occurs through the acquisition of liquid egg whites separated from the egg yolks by hand or mechanical egg separation techniques. Care should be utilized to avoid incorporation of excess air of the egg white component of the formulated fried egg during exposure to mechanical egg shelling and separation techniques. The liquid egg white and/or liquid egg yolk portions of the formulated fried egg may be obtained from shell eggs and/or pasteurized shell eggs. Dried egg white powder and/or egg yolk powder may be added to the liquid egg yolk portion to improve the density, texture, and mouth feel for the egg yolk portion of the formulated fried egg.

The liquid egg whites as separated from the liquid egg yolks form the starting materials for the formulated fried egg product. In general, the liquid egg whites may be raw or pasteurized for use as the starting material.

The formulated fried egg product preferably has the physical and chemical characteristics of a natural fried egg and is sensorily acceptable as a formulated fried egg product in substitution for a standard natural fried egg.

In general, the process for formulation of the fried egg includes: obtaining a desired amount or volume of liquid egg yolks, and liquid egg whites and placing the liquid eggs into separate mixing tanks or vessels (1W, 1Y). Additional ingredients including, but not necessarily limited to: oils; gums and modified food starches; non-fat dry milk; salt; water and citric acid may be placed into a separate vessel. The "dry ingredients" are then preferably separately mixed. The mixed "dry ingredients" may then be introduced into the respective vessel containing liquid egg whites and/or liquid egg yolks (1W, 1Y) whereupon mixing should occur. Alternatively, the applicable "dry ingredients" may be directly mixed within the individual vessels containing the liquid egg whites and/or the liquid egg yolks.

Mixing (1W, 1Y) may occur through the use of a high shear mixer for a desired period of time which may be five minutes at a speed of 3450 rotations per minute resulting in a homogeneous liquid egg white and/or egg yolk product. A preferred mixer is an Admix High Shear Mixer. Mixing may result in the formation of a foam which is preferably removed from the liquid egg white and/or liquid egg yolk mixture.

Alternatively, the ingredients for the liquid egg whites and liquid egg yolks may be mixed separately for approximately 5 to 10 minutes and then the individual mixed liquid egg whites and liquid egg yolks may be pumped through commercial processing equipment for deposit into a mold for cooking in a commercial convection oven. Alternatively, the liquid egg whites and/or liquid egg yolks may be separately mixed through constant stirring for a desired period of time whereupon the mixed liquid egg whites and liquid egg yolks may be further processed. Alternatively, the separately mixed liquid egg whites and/or liquid egg yolks may be homogenized through commercially available homogenizing equipment. It is also generally desirable to avoid excessive mixing or agitation of the liquid egg whites and/or liquid egg yolks which may result from the use of powerful mixing equipment. Excessive mixing causes aeration within the liquid egg product resulting in the formation of air bubbles during cooking of the formulated fried egg. Excessive agitation may further cause the degradation of the egg whites and/or egg yolks adversely affecting the quality of the formulated fried egg product.

The mixed liquid egg whites may then be pumped for preheating within a heat exchanger (4W). The mixed liquid egg yolks may also be pumped for preheating within a second heat exchanger (4Y). The preheated liquid egg white product may then be pumped into a depositor (5W). The preheated liquid egg yolk product may then be pumped into a second depositor (5Y). Either the whites or the yolk may be deposited first, however, the preferred method deposits the white portion first. Further cooking of the egg white and egg yolk portions normally follows by passing of the molds (6) containing the preheated liquid egg whites and yolks through a convection oven (7). The cooked fried eggs are then removed from the molds, cooled, frozen (9), and stored (10). The previously frozen cooked fried eggs may then be reheated for consumption alone or inclusion within a food product such as breakfast sandwich.

Citric acid and/or other chelating agents may be added to the liquid egg yolk and liquid egg white portions. In a preferred application citric acid or citric acid in combination with xanthan gum may be added to the liquid egg yolk. The citric acid slows the iron sulfide generating reaction during cooking and improves the appearance of the egg yolk while simultaneously increasing the viscosity of the egg yolk at lower cooking temperatures. In a preferred application, EDTA may be added to the egg white to further slow the iron sulfide reaction. Additional functional effects of the citric acid are a synergistic effect with the use of xanthan resulting in greater viscosity (Table 1). This results in a fluid flow that allows controllable deposition of the yolk material at lower temperatures than typical for this type of product which results in a more desirable appearance.

It is desirable for the egg white portion following cooking to be elastic, smooth, have a cohesive texture, be tender and fracture providing the appearance of a natural egg white portion of a fried egg. To achieve egg white consistency, minimization of air bubbles is required to maintain a continuous cohesive texture. In order to assist in the improvement of the consistency and texture of the egg white portion, modified food starch may be added. Modified food starch provides slightly better texture and consistency for the cooked egg white portion of the formulated fried egg. The use of modified food starch at a level of approximately 1.5% also provides adequate freezer/thaw protection for the formulated fried egg. In addition, the texture and/or appearance of the egg white portion or yolk portions may be influenced by the type of gum which is added to the formulated fried egg. To improve texture and/or appearance, guar and/or xanthan gum provide acceptable results upon cooking of the formulated fried egg. The texture and/or appearance of the formulated fried egg following cooking is improved through the addition of a combination of modified food starch and gum. The use of excessive modified food starch should be avoided to minimize perceived rubberiness and undesirable mouth feel for the formulated fried egg. The use of xanthan gum also improves the mouth feel characteristics for the formulated fried egg following cooking.

In order to minimize undesirable bubbling particularly within the egg white portion a procedure may be implemented to degas and to remove air bubbles from the liquid egg whites. A vacuum treatment may be introduced for a period of approximately two hours in order to attempt to draw air bubbles to the surface of the liquid egg whites. Air bubbles may float to the surface of the liquid egg whites following depressurizing of the container holding the liquid egg whites.

The pH of liquid egg white immediately after it is laid by the chicken is approximately 6.8. The main buffering agent in the egg white is bicarbonate. Over time, the bicarbonate breaks down to carbon dioxide and water. The loss of the carbon dioxide through the porous shell result in a rise in the pH. Once the eggs are separated, changes in pH are minimal because of the greatly reduced surface to volume ratio for carbon dioxide release. Typical commercial liquid egg white has a pH normally between 8.2 to 8.5. An increase in the pH of the liquid egg white portion to a level between 8.8 and 9.1 decreases, through the adjustment of pH with organic bases, cupping and air bubble formation in the cooked egg white portion.

The use of 1.0 ml. of 1.0 normal NaOH (40 g/960 ml. water) at approximately 1.0 ML. NaOH solution to 100 ml. of liquid egg whites increases the pH from approximately 8.4 to 8.8. The greatest effect of bubble and cupping reduction for the liquid egg whites occurs when the pH is approximately 9.0 accompanied by a low percentage of modified food starch and xanthan gum.

In general, the ingredients for the egg white portion and the egg yolk portion are not required to be combined in any preferred order for mixing. The ingredients of the egg white portion and the egg yolk portion are preferably mixed cold at a temperature between 32° F. and 40° F., 0° C. and 4.44° C. and more preferably less than 40° F., 4.44° C. Water may be added to the "dry ingredients" to facilitate mixing. The "dry ingredients" and water may then be mixed into the respective liquid egg whites and/or liquid egg yolks to formulate the individual core components for the formulated fried egg product. The mixing time for the respective egg whites and/or egg yolk portions is reduced to a minimum and generally is no longer than necessary to insure adequate mixing. The mixing may occur through the use of a high shear mixer as is commercially available.

Following the completion of mixing of the liquid egg whites and/or liquid egg yolks, a preheating step may occur prior to the cooking of the fried egg product. In operation, the preheating phase is generally continuous for the enhanced mixed liquid egg whites and liquid egg yolks. Preheating occurs as the liquid egg white mixture and liquid egg yolk mixture is pumped through a respective set of equipment for introduction to a tube in tube heat exchanger for each mixture. The temperature of the enhanced liquid egg white mixture and liquid egg yolk mixture prior to the respective tube in tube heat exchanger is approximately 40° F., 4.44° C.

The temperature of the enhanced mixture of liquid egg whites and liquid egg yolks exiting the respective tube in tube heat exchanger and/or a respective scraped surface heat exchanger following completion of preheating is approximately 135° F., 57.22° C. The preheating phase elevates the temperature of the enhanced liquid egg white mixture and liquid egg yolk mixture prior to the introduction of the liquid egg white mixture and/or liquid egg yolk mixture into a respective depositor. The preheating of the mixed liquid egg whites and mixed liquid egg yolks may occur within individual tube in tube heat exchangers. One such tube in tube heat exchanger is a Paratube manufactured by APV.

In addition, the preheating procedure may continue through the use of scraped surface heat exchangers which may be identified as Contherm Swept Surface Heat Exchangers. It should also be noted that the preheating may be eliminated and/or significantly reduced so long as cooking times and temperatures are correspondingly adjusted for cooking of the enhanced formulated fried egg at a sufficiently low temperature and for a sufficiently short duration of time to avoid burning, sticking, and/or other undesirable complications associated with the cooking process. Undesirable complications include, but are not necessarily limited to, excessive bubbling where the starting liquid egg whites and/or liquid egg yolks have not been previously preheated. The formation of an undesirable skin for the fried egg and the undesirable hardening of the egg yolk portion, undesirable skin formation usually occurs when the formulated fried egg is exposed to excessive temperature and/or cooking time.

Immediately following preheating, the mixed liquid egg whites are preferably pumped through the depositor for the delivery of a specific weight or volume of mixed liquid egg whites into a mold at a set rate. The speed or rate of the depositor may be adjusted dependent upon the temperature of the oven and cooking time exposed to the formulated fried egg. The speed of the depositor is the rate at which a mold is filled with mixed liquid egg white for movement through an oven. The molds filled with the liquid egg whites may then be passed through a second depositor which contains the preheated liquid egg yolks. The second depositor then deposits a desired volume of preheated liquid egg yolk material upon the previously dispensed egg whites. The placement of the egg yolk material into the egg whites results in a non-uniform, natural appearance. Following the deposit of the preheated liquid egg yolk material into the previously partially filled mold containing the egg whites, the mold may be transported to an oven for cooking.

During formation of the formulated fried egg following preheating of the egg white portion, deposit of the egg white portion within the mold, and/or the initiation of the cooking of the egg white portion, the liquid egg yolk portion is heated to a temperature just below the coagulation point for the liquid egg yolk. The adjustment of the yolk pH with citric results in a lowering of this temperature such that the process may be carried out without the typical problems of burn-on the heat exchangers. The heated egg yolk is then deposited into the mold upon the preheated egg white portion. The appearance of the position of the egg yolk portion upon the egg white portion is generally non-uniform between individual portions of the formulated fried egg. The mold containing the egg yolk and egg white portions is then cooked increasing the viscosity of the egg white and egg yolk portions.

The conveyor preferably transports molds filled with liquid egg white material to a second depositor or dispensing machine for receipt of a portion of liquid egg yolk material. The conveyor continues to transport the molds containing the liquid egg white and liquid yolk material into a convection oven for heating.

The conveyor also preferably transports individual cooked formulated fried eggs to a freezing and package stage where one or more of the individual formulated fried eggs may be packaged together.

The humidity of the oven is an important factor during cooking of the formulated fried egg. Increased humidity within the oven enhances the sensory perceptions such as appearance, taste, and mouth feel for the cooked formulated fried egg. Cooking of the formulated fried egg product therefore occurs at a high moisture atmosphere at an approximate temperature of 350° F. or 176° C. A gas fired steam injection cooker as available from Hobart is adequate for the cooking purposes. It is anticipated that the minimum temperature of the product is required to exceed 165° F. or 73.89° C. The oven is preferably completely preheated in order to attempt to obtain an equilibration of the cooking components.

The conditions of the oven during the initial cooking of the formulated fried egg, and the condition of the oven during reheating of the formulated fried egg following freezing, has a large impact upon skin formation and egg texture. To minimize undesirable skin formation and to maximize the texture, taste, mouth feel, and other sensory perceptions, the formulated fried egg should be cooked slowly at relatively low temperatures. In addition, humidity with the oven should be maximized. The speed of cooking of the formulated fried egg significantly impacts the final textural properties as perceived by consumers. Cooking of the formulated fried egg to rapidly and at an increased temperature causes air bubbles to form which interrupt the egg structure and particularly the egg white structure destroying the smooth cohesive texture for the formulated fried egg.

The oven conditions during cooking may vary. Generally, cooking of the formulated fried egg at may occur a temperature of 325° F. or 162° C. at a full steam setting where the cooking time is 7.75 minutes. These cooking conditions provide an acceptable cooked formulated fried egg.

Alternatively, cooking of the formulated fried egg may occur at a temperature of 375° F. or 190° C. at full steam for 6.5 minutes to yield an acceptable cooked formulated fried egg.

In another embodiment, cooking of the formulated fried egg may occur at a temperature of approximately 375° F. or 190° C. for 6.5 minutes where full steam is provided for the final one-third of the cooking time to yield an acceptable cooked formulated fried egg.

In yet another embodiment, cooking of the formulated fried egg may occur at a temperature of approximately 425° F. or 218° C. for 5.5 minutes where full steam is provided during the entire cooking duration to yield an acceptable cooked formulated fried egg.

A force air or convection oven may be utilized to cook the formulated fried egg. Alternatively, a batch oven may be utilized to cook the formulated fried egg. The cooking times for the formulated fried egg in a batch oven are normally between 6.5 and 8 minutes. In addition, it is preferable to lower the cooking temperature and to increase the pH within the formulated fried egg to maximize quality. A cooking time of 6.5 to 8 minutes has been found to be adequate for coagulation of the egg proteins for the formulated fried egg.

In general, a continuous forced draft convection heating oven is utilized for cooking of the formulated fried egg. A suitable forced draft convection heating oven is preferably identified as a Wolverine Proctor Convection Oven. The operational oven temperature parameters are usually identified as 325° F. to 475° F. or 162° C. to 246° C. where the dampers and relative humidity within the convection oven may be adjusted dependent upon the local environmental conditions as identified within the examples indicated herein.

During cooking, each mold may be covered to minimize dehydration and crusting of the fried egg surface. Cooking of the formulated fried eggs within enclosed molds usually occurs at lower cooking temperatures of approximately 325° F. or 162° C.

The molds utilized to cook the formulated fried egg may prepared in a variety of configurations. A preferred embodiment would be a preformed, stamped oven mold with a diameter of between 3 in. to 3.5 in. or 7.62 cm. to 8.89 cm. Alternatively, each mold may include one row of 3 egg receiving areas. Alternatively, a mold may include any desired number of rows of egg receiving areas. In addition, the interior of the egg receiving areas of each mold may be treated with a non-stick coating and a release agent to reduce the undesirable sticking of the cooked formulated fried egg within the mold. Each egg receiving area of each mold is preferably constructed and arranged to hold up to 100 grams of egg material, however, this is a function of mold size.

The mold as utilized herein is preferably substantially circular in shape and has a sufficient depth to hold for cooking the mixed liquid egg whites and subsequent deposited mixed liquid egg yolk material. However, mold shape is not limited to circular.

The molds containing the cooked formulated fried eggs may be frozen in any manner as desired including, but not necessarily limited to, freezing upon exposure to carbon dioxide snow; cryogenic freezing through the use of liquid nitrogen; and/or freezing through convention freezing techniques. Alternatively, liquid nitrogen may be used as the freezing medium which may be either sprayed upon or exposed to the product through conventional processing techniques.

Following cooking, the formulated fried eggs may be individually quick frozen. Slow freezing results in large ice crystals that disrupt the structure. Upon thawing or reheat, the product losses water. Generally as the time required for freezing ingredients decreases the quality of the frozen article after thawing increases. The described invention allows the product to be frozen slowly. A spiral freezer may be utilized to individually quick freeze the formulated fried egg product. The through-put for the freezer may establish a freezing time of approximately 30 minutes. The formulated fried egg product may be exposed to a temperature below −10° F., −23° C. and not to exceed 20° F., −6° C. Following the individual quick freezing of the cooked formulated fried egg product, the fried egg product may be reheated and held for extended duration of time without the sacrifice of product quality.

Various ingredients are utilized to provide a desired quality for a composite formulated fried egg. Generally, the ingredients to be incorporated into the formulated fried egg include: egg yolk; xanthan gum; salt; corn syrup solids; citric acid; carrageenan; annatto; whole egg; egg whites; soy bean oil; modified food starch; dairy ingredients (non-fat dry milk and whey solids); modified food starch; sodium lauryl sulfate (SLS or SDS); modified food starch; guar gum; and flavors. Further, the formulated fried egg product may include water, soy bean oil, corn oil, citric acid, and/or flavors. The ingredients described herein have been provided for illustrative purposes only and the group of ingredients identified herein may comprise any number of additional items identified in this description or which have not been previously identified.

Egg whites generally form between 50% and 99.5% of the total percent weight of the entire egg white portion of the formulated fried egg product (Table 2). Water is generally provided in an amount between 0% and 10% of the total weight of the egg white portion. Soy bean oil and/or corn oil is usually provided between 0% and 10% as based upon the percentage of total weight for the egg white portion. Modified food starch is generally provided between 0% to 3% of the total weight of the egg white portion. Dried dairy ingredients such as non-fat dried milk and whey solids generally provide between 0% to 3% of the total weight of the egg white portion. Salt is generally provided between 0% to 1% of the total weight of the egg white portion. Xanthan gum, or other carbohydrate gums such as guar or carrageenan, is generally provided between 0% to 0.4% of the total weight of the egg white portion. Modified food starch is generally provided between 0% to 3% of the total weight of the egg white portion. Citric acid is generally provided between 0% to 0.2% of the total weight of the egg white portion. Natural flavor may be added between 0% and 0.1% of the total weight of the egg white portion as desired.

The egg yolk portion generally has egg yolks in the percentage amount between 50% to 99.9% of the total weight of the egg yolk portion of the formulated fried egg product (Table 3). Xanthan gum is generally provided between 0% to 0.5% of the total weight of the egg yolk portion. Salt is generally provided between 0% to 0.4% of the total weight of the egg yolk portion. Citric acid is generally provided between 0% to 0.15% of the total weight of the egg yolk portion.

A typical formula for the egg white portion utilized within the formulated fried egg product would involve the use of egg whites constituting 81% of the total weight of the egg white portion of the fried egg product; water comprising 10% of the total weight of the egg white portion of the fried egg product; soy bean oil/corn oil constituting 4% of the total weight of the egg white portion of the fried egg product; modified food starch being 2.5% of the total weight of the egg white portion of the fried egg product; dairy ingredients (e.g., non-fat dry milk, whey solids) at 2% of the total weight of the egg white portion of the fried egg product; salt in the amount 0.35% of the total weight of the egg white portion of the fried egg product; and xanthan gum in the amount of 0.15% of the total weight of egg white portion of the fried egg product.

The procedures identified herein enable individual formulated fried eggs to be held frozen, refrigerated for extended periods of time without loss of product integrity.

EXAMPLES

Example I

Cooked egg white compositions were evaluated for texture after thawing and reheating. Liquid, blended egg white was mixed with one or more of modified food starch, gums (xanthan or guar), soy oil, and salt prior to cooking as shown in Table 4. Egg white mixtures, approximately 50 grams were cooked in 3.5-inch diameter molds at a temperature of 325° F. using a forced draft oven. The cooked egg white portions were frozen in a blast freezer unit, held frozen until being reheated for evaluation.

Egg white portions were reheated using an 1100-watt microwave oven. Individual portions were placed on paper plates, covered with a second plate and heated to internal temperatures above 140° F. The texture was evaluated. Table 4 presents the valuation of texture. A range of compositions with modified food starch, gum, and oil were found that have very good textures. Formulations without oil or formulations without modified food starch were not as effective in providing a texture that simulates the elastic texture of freshly cooked egg white.

Example II

Egg yolk formulas were evaluated for viscosity and color. Liquid yolk was mixed with one or more of citric acid, salt, and xanthan. Table 5 shows that viscosity was increased by the addition of xanthan with or without citric acid. The combination of xanthan and citric acid resulted in a viscosity level about twice as large as the viscosity level found when only xanthan was used.

The combination of citric acid and xanthan resulted in desirable viscosity suitable for depositing during manufacturing of fried egg products. The flavor and texture were comparable and as acceptable as the yolk formulations outlined in Table 3.

Adding citric acid increased the L-values, decreased the a-values, and increased the b-values as found for egg yolk without citric acid.

Example III

Types of egg white were evaluated for forming a smooth and continuous cooked structure. Whites where from shell eggs without blending or blended liquid egg white. Blend broken out whites were cooked with and without pH adjustment as presented in Table 6.

These results summarized in Table 6 demonstrate that commercially processed broken out (BO) whites are more disposed to bubble formation than hand broken intact egg magna (intact shell) or hand separated whites (shell whites). Lower cooking temperature and higher pH mediated this effect. Adjustment of pH was with 1.0N NaOH (40 g/960 ml water) ~1.0 ml per 100 ml egg.

Formulated product made with various egg whites mixed with 2.5% modified food starch and 0.2% Xanthan gum were evaluated. Portions were 50 g white. Results in Table 7 show that better texture, as indicated by bubbling, crusting, or fluffing, was obtained from egg white with higher pH. Adjusting pH or using naturally aged egg white with pH at or above 8.8 favored continuous elastic texture.

Example IV

Commercially separated egg white was mixed with soybean oil, modified food starch, salt and xanthan gum in a high shear mixer. Mix weights of 2700, 242, 76, 12, and 1.5 lbs, respectively of the ingredients were mixed in a high shear mixer for 5 minutes, 30 seconds. An egg yolk batch was similarly mixed using 2500 lb commercial yolk, 3.76 lb salt, 5 lb xanthan gum, and 2.5 lb citric acid for 6 minutes. The resulting batches were transferred to a holding vat with agitation.

The egg whites were preheated using a shell in tube heat exchanger. The egg whites were preheated to 130° F. and then deposited into 3 inch molds. The yolk portion was preheated through a separate heat exchanger and then deposited into the mold on top of the egg whites. The depositors cycled at 20 shots per minute resulting in 1200 lbs. egg white portion and 300 lbs. egg yolk portion per hour.

The pans entered the oven, set at 325° F. and cooked for 2.5-3.0 minutes.

The product exited the oven, was transferred onto a conveyor and then entered the spiral freezer set at −20° F. After thoroughly freezing, the product was packaged and stored frozen.

TABLE 1

Data on effect of yolk pH on formulation physical characteristics.

| Sample # | Ingredients | Percentage | pH (59° F.) | Viscosity @ 59° F. (cp) | Colorimeter L | a | b |
|---|---|---|---|---|---|---|---|
| YF-1 | Yolk | 100.00% | 6.60 | 438 | 57.68 | 0.64 | 52.60 |
|  |  | 100.00% |  |  | 57.68 | 0.62 | 52.66 |
|  |  |  |  |  | 57.67 | 0.66 | 52.66 |
| YF-2 | Yolk | 99.90% | 5.96 | 348 | 60.31 | −1.74 | 57.87 |
|  | Citric Acid | 0.10% |  |  | 60.31 | −1.71 | 57.90 |
|  |  | 100.00% |  |  | 60.30 | −1.69 | 57.92 |
| YF-3 | Yolk | 99.65% | 6.56 | 1842 | 54.87 | 0.64 | 52.40 |
|  | Salt | 0.15% |  |  | 54.80 | 0.64 | 52.72 |
|  | Xanthan Gum | 0.20% |  |  | 54.77 | 0.63 | 52.91 |
|  |  | 100.00% |  |  |  |  |  |
| YF-4 | Yolk | 99.55% | 5.99 | 3640 | 58.16 | −1.89 | 56.01 |
|  | Salt | 0.15% |  |  | 58.12 | −1.89 | 56.06 |
|  | Citric Acid | 0.10% |  |  | 58.11 | −1.90 | 56.08 |
|  | Xanthan Gum | 0.20% |  |  |  |  |  |

TABLE 1-continued

Data on effect of yolk pH on formulation physical characteristics.

| Sample # | Ingredients | Percentage | pH (59° F.) | Viscosity @ 59° F. (cp) | Colorimeter L | a | b |
|---|---|---|---|---|---|---|---|
| | | 100.00% | | | | | |

TABLE 2

Egg white portion formulations.

| Formulation | Egg White | Water | Soy/Corn Oil | Modified Food Starch | Dairy Ingredients | Salt | Xanthan Gum | SDS |
|---|---|---|---|---|---|---|---|---|
| Typical | 97.15 | | | 2.5 | | 0.35 | | |
| Typical | 99.25 | | | 0.5 | | 0.4 | 0.25 | |
| Typical | 98.88 | | | 1.0 | | 0.4 | 0.13 | |
| Typical | 97.2 | | | 2.5 | | | | |
| Typical | 97.2 | | | 2.5 | | | 0.2 | |
| Typical | 85.6 | | | 2.0 | | 0.4 | 0.2 | |
| A | 81.0 | 10.0 | 4.0 | 2.5 | 2.0 | 0.35 | 0.15 | |
| B | 85.9 | 7.15 | 4.0 | 2.5 | | 0.35 | | |
| C | 93.15 | | 4.0 | 2.5 | | 0.35 | | |
| D | 91.65 | | 6.0 | 2.0 | | 0.35 | | |
| E | 83.0 | 10.0 | 2.5 | 2.5 | | 0.35 | 0.35 | |
| F | 85.65 | 7.0 | 2.0 | 2.0 | | 0.35 | | |
| G | 89.1 | | 8.0 | 2.5 | | 0.4 | | |
| H | 91.1 | | 6.0 | 2.5 | | 0.4 | | |
| I | 92.45 | | 6.0 | 1.0 | | 0.4 | 0.15 | |
| J | 87.1 | | 10.0 | 2.5 | | 0.4 | | |
| K | 90.55 | | 8.0 | 1.0 | | 0.4 | 0.05 | |
| L | 89.1 | | 9.0 | 1.5 | | 0.4 | | |
| M | 90.05 | | 8.0 | 1.5 | | 0.4 | 0.05 | |
| N | 91.6 | | 8.0 | | | 0.4 | | |
| O | 94.25 | | 2.0 | 3.25 | | 0.4 | | 0.1 |
| P | 93.0 | | 2.0 | 4.5 | | 0.4 | | 0.1 |
| Q | 94.0 | | 2.0 | 3.25 | | 0.4 | | 0.35 |
| R | 89.05 | | 8.0 | 2.5 | | 0.4 | 0.05 | |

TABLE 3

Egg yolk portion formulations.

| Formulation | Egg Yolk | Egg White | Salt | Modified Food Starch | Water | Citric | Xanthan Gum | Carageenan |
|---|---|---|---|---|---|---|---|---|
| Typical | 99.57 | | 0.40 | | | | 0.225 | |
| Y-A | 79.9 | 19.5 | 0.25 | | | | 0.25 | |
| Y-B | 99.5 | | 0.15 | | 0.10 | 0.10 | 0.20 | |

TABLE 4

Composition of reheated egg white formulas evaluated for texture after cooking, freezing and thawing.

| Code | Egg white | Mod. Food Starch | Gum | Soy Oil | Salt | SDS | Comments |
|---|---|---|---|---|---|---|---|
| 98-1043A | 99.25 | 0.5 | | | | 0.25x | Gritty Texture |
| 98-1043B | 98.88 | 1.0 | | | | 0.13x,g | Gritty Texture |
| 98-1043C | 89.1 | 2.5 | | 8.0 | 0.4 | | Most like egg |
| 98-1043D | 91.1 | 2.5 | | 6.0 | 0.4 | | Like egg |
| 98-1043E | 92.45 | 1.0 | 0.15x | 6.0 | | | Good, slightly gritty |

TABLE 4-continued

Composition of reheated egg white formulas evaluated for texture after cooking, freezing and thawing.

| Code | Egg white | Mod. Food Starch | Gum | Soy Oil | Salt | SDS | Comments |
|---|---|---|---|---|---|---|---|
| 98-1043F | 87.1 | 2.5 | | 10.0 | 0.4 | | Close, slightly less tender than C |
| 98-1043G | 90.55 | 1.0 | 0.05x | 8.0 | 0.4 | | Cuts like egg, softer than C&F |
| 98-1043H | 89.1 | | 1.5x | 9.0 | 0.4 | | Spongy, similar to G |
| 98-1043I | 90.05 | 1.5 | 0.05x | 8.0 | 0.4 | | Spongy |
| 98-1043J | 91.6 | | | 8.0 | 0.4 | | Wet texture |

TABLE 5

Yolk formulas and viscosity.

| Code | Yolk | Citric acid | Salt | Xan-than | pH | L | a | b | Viscosity @ 59° F. Cp |
|---|---|---|---|---|---|---|---|---|---|
| YF-1 | 100.0 | | | | 6.6 | 57.68 | 0.64 | 52.6 | 438 |
| YF-2 | 99.9 | 0.1 | | | 5.9 | 60.3 | -1.7 | 57.9 | 348 |
| YF-3 | 99.65 | | 0.15 | 0.2 | 6.6 | 54.8 | 0.64 | 52.7 | 1842 |
| YF-4 | 99.55 | 0.1 | 0.15 | 0.2 | 5.9 | 58.1 | -1.8 | 56.0 | 3640 |

TABLE 6

Effects of egg white source and pH adjustment on bubble formation.

| Cook Temp. F. | Cook Time Minutes | Egg Source | pH | Bubbles |
|---|---|---|---|---|
| 325 | 8 | Intact Shell | — | + |
| 325 | 8 | Shell Whites | — | + |
| 325 | 8 | Adj. BO Whites | 9.0 | ++ |
| 325 | 8 | BO Whites | 8.6 | +++ |
| 350 | 7 | Intact Whites | — | + |
| 350 | 7 | BO Whites | 8.6 | ++++ |
| 350 | 7 | BO Whites | 8.46 | +++++ |
| 350 | 7 | Adj. BO Whites | 8.9 | ++ |

Starch Formulation and pH Adjustment

TABLE 7

Effects of egg white source, pH adjustment and starch addition on texture and appearance

| Cook | Egg Source | pH | Bubbles | Crust | Fluffing |
|---|---|---|---|---|---|
| 1A | Fresh BO whites | 8.27 | ++++ | +++ | +++ |
| B | 10 day whites | 8.55 | ++++ | +++ | +++ |
| 2A | Heated whites | — | +++ | +++ | ++ |
| B | Adj. Fresh BO whites | 8.83 | ++ | ++ | + |
| C | Adj. 10 day whites | 8.93 | + | + | + |
| 3A | Formulated | 8.26 | ++ | +++ | +++ |
| B | Adj. | 9.06 | + | ++ | +++ |
| 4A | Formulated Adj. (50 F.) | 9.06 | ++ | ++ | + |
| B | Adj. Formulated (70 F.) | 9.00 | ++ | No data | No data |

Formulated product included 97.3% white (fresh) 2.5% modified food starch, 0.2% Xanthan gum.

Portions were 50 g white except cook 4 which was 35 g formulated white +15 g Easy Egg.

pH adjustment with NaOH improved texture of the product. Product formulated with starch and gum also had good texture.

It should be noted that the process steps identified above may be substantially interchanged and modified without sacrifice as to the final formulated fried egg so long as temperature is regulated and mixing time is regulated to avoid excessive temperatures and over mixing.

In general, the ingredients identified herein have been provided for illustrative purposes and should not be considered as restrictive. In addition, reference herein to modified food starch may generally include a wide variety of commercially available corn starches and/or potato starches used in food products which are FDA approved for consumption by individuals. In addition, certain sugars may be used as substitutes for or in combination with either of the modified food starches identified herein. Further, reference herein to soy oil and/or corn oil may include reference to other edible oils namely peanut oil, and vegetable oils. It should also be noted that a number of alternative edible oils may adequately function as substitute ingredients for the identified soy bean oil and/or corn oil herein.

Carboxymethylcellulose, carrageenan, guar gums, locust bean gum, beta carotene, agar, glycerol mono stearate, mono diglycerides and polypropylene glycol esters may function as acceptable substitutes and/or replacements for the xanthan gum and the gums and emulsifiers herein. Further, other milk products may be substituted for the non-fat dry milk and whey as used herein for incorporation into the consumable food product including eggs.

It should be noted that the percentage weights provided herein have been rounded mathematically which in certain instances may not exactly equal 100%. In these instances, the percentage of eggs and/or water may be insignificantly increased or decreased to provide a 100% summation.

The above examples and disclosure are intended to be illustrative and not exhaustive. These examples and description will suggest many variations and alternatives to one of ordinary skill in the art. All of these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof; therefore, the illustrative embodiments should be considered in all respects as illustrative and not restrictive, reference being made to dependent claims rather than to the foregoing description to indicate the scope of the invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below (e.g. Claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternate embodiments of the invention. Those skilled in the art may recognize other equivalents to the specific embodiment described herein which equivalents are intended to be encompassed by the claims attached hereto.

The invention claimed is:

1. A formulated fried egg comprising:
    a) an egg white portion, said egg white portion comprising egg whites which form between 81% and 99% by weight of said egg white portion; oil which forms between 2% and 10% by weight of said egg white portion; and salt which forms between 0.35% and 0.8% by weight of said egg white portion; and
    b) an egg yolk portion that is dried egg yolk, frozen egg yolk, fresh egg yolk or a combination thereof, said egg yolk portion comprising egg yolk which forms between 50% and 99.9% by weight of said egg yolk portion and gum which forms between 0.1% and 0.5by weight of said egg yolk portion
    wherein said egg white portion and said egg yolk portion are separately deposited into a mold which is used in a process to provide said formulated fried egg wherein said formulated fried egg has the natural look of a fried egg.

2. The formulated fried egg according to claim 1, said egg white portion further comprising modified food starch, said modified food starch forming between 1% and 3% by weight of said egg white portion.

3. The formulated fried egg according to claim 2, said egg yolk portion further comprising a chelating agent, said chelating agent forming between 0.01% and 0.2% by weight of said egg yolk portion.

4. The formulated fried egg according to claim 3, wherein said egg white portion further comprises EDTA.

5. The formulated fried egg according to claim 3, said egg white portion further comprising gum, said gum forming between 0.01% and 0.4% by weight of said egg white portion.

6. The formulated fried egg according to claim 5, wherein the chelating agent is citric acid and said egg yolk portion further comprises gum and salt, said salt forming between 0.01% and 0.5% by weight of said egg yolk portion.

7. The formulated fried egg according to claim 6, said egg white portion further comprising water, said water forming between 2.5% and 11by weight of said egg white portion.

8. The formulated fried egg according to claim 1 wherein the egg yolk portion further comprises sodium lauryl sulfate.

9. The formulated fried egg according to claim 1 wherein the egg white portion further comprises dairy ingredients.

10. The formulated fried egg according to claim 9 wherein the dairy ingredients are non-fat dried milk, whey solids or a combination thereof.

11. The formulated fried egg according to claim 1 wherein said egg white portion is dried egg white, frozen egg white, fresh egg white, or a combination thereof.

* * * * *